(12) United States Patent
Gingrich, III et al.

(10) Patent No.: US 7,942,563 B2
(45) Date of Patent: May 17, 2011

(54) LED WITH LIGHT PIPE ASSEMBLY

(75) Inventors: Charles Raymond Gingrich, III, Mechanicsburg, PA (US); Christopher George Daily, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 292 days.

(21) Appl. No.: 12/364,802

(22) Filed: Feb. 3, 2009

(65) Prior Publication Data
US 2009/0219732 A1    Sep. 3, 2009

Related U.S. Application Data

(60) Provisional application No. 61/032,653, filed on Feb. 29, 2008.

(51) Int. Cl.
*F21V 29/00* (2006.01)
*F21V 7/04* (2006.01)
(52) U.S. Cl. ......... 362/555; 362/580; 362/294; 362/373
(58) Field of Classification Search ............... 362/555, 362/551, 580, 294, 373, 345, 264, 218, 126, 362/547
See application file for complete search history.

(56) References Cited

U.S. PATENT DOCUMENTS

| | | | |
|---|---|---|---|
| 4,613,931 A * | 9/1986 | Messinger | 362/373 |
| 5,099,399 A * | 3/1992 | Miller et al. | 362/580 |
| 6,517,218 B2 | 2/2003 | Hochstein | |
| 6,541,800 B2 | 4/2003 | Barnett et al. | |
| 6,779,929 B1 | 8/2004 | Savage | |
| 6,833,566 B2 | 12/2004 | Suehiro et al. | |
| 6,905,214 B2 * | 6/2005 | Tani | 353/56 |
| 6,945,674 B2 * | 9/2005 | Yoneda et al. | 362/294 |
| 6,991,456 B2 | 1/2006 | Plank | |
| 6,999,318 B2 | 2/2006 | Newby | |
| 7,118,255 B2 | 10/2006 | Galli | |
| 7,138,667 B2 | 11/2006 | Barnett et al. | |
| 7,192,163 B2 | 3/2007 | Park | |
| 7,196,459 B2 | 3/2007 | Morris | |
| 7,218,041 B2 | 5/2007 | Isoda | |
| 7,236,366 B2 | 6/2007 | Chen | |
| 7,303,301 B2 | 12/2007 | Koren et al. | |

(Continued)

FOREIGN PATENT DOCUMENTS

EP    1 388 326 A2    2/2004

(Continued)

OTHER PUBLICATIONS

International Search Report, International Application No. PCT/US2009/001195, International Filing Date, Feb. 26, 2009.

*Primary Examiner* — Bao Q Truong

(57) ABSTRACT

An LED light pipe assembly includes a light pipe; a heat sink portion; an LED mounted on a substrate in optical communication with the light pipe; and a carrier portion for receiving the light pipe and providing electrical interconnections to the LED. The heat sink portion includes a plurality of fins and a plurality of hollow frame portions configured to dissipate heat generated by the light pipe assembly. Attachment features are provided on the heat sink for attaching the heat sink to the carrier portion. The heat sink portion also includes a hollow cavity for receiving the substrate. The carrier portion is insertable into the cavity in abutting relation with the substrate to secure the substrate in contact against the heat sink.

20 Claims, 6 Drawing Sheets

U.S. PATENT DOCUMENTS

| | | | |
|---|---|---|---|
| 7,510,313 B2 * | 3/2009 | Blum et al. | 362/580 |
| 2004/0012965 A1 * | 1/2004 | Yoneda et al. | 362/294 |
| 2005/0024834 A1 | 2/2005 | Newby | |
| 2005/0201100 A1 | 9/2005 | Cassarly et al. | |
| 2005/0231974 A1 * | 10/2005 | Ruffin | 362/555 |
| 2006/0061989 A1 | 3/2006 | Holder et al. | |
| 2007/0070645 A1 | 3/2007 | Coushaine et al. | |

FOREIGN PATENT DOCUMENTS

| | | |
|---|---|---|
| EP | 1 919 001 A1 | 5/2008 |
| WO | 2005013366 A1 | 2/2005 |
| WO | WO 2007/013563 A1 | 2/2007 |

* cited by examiner

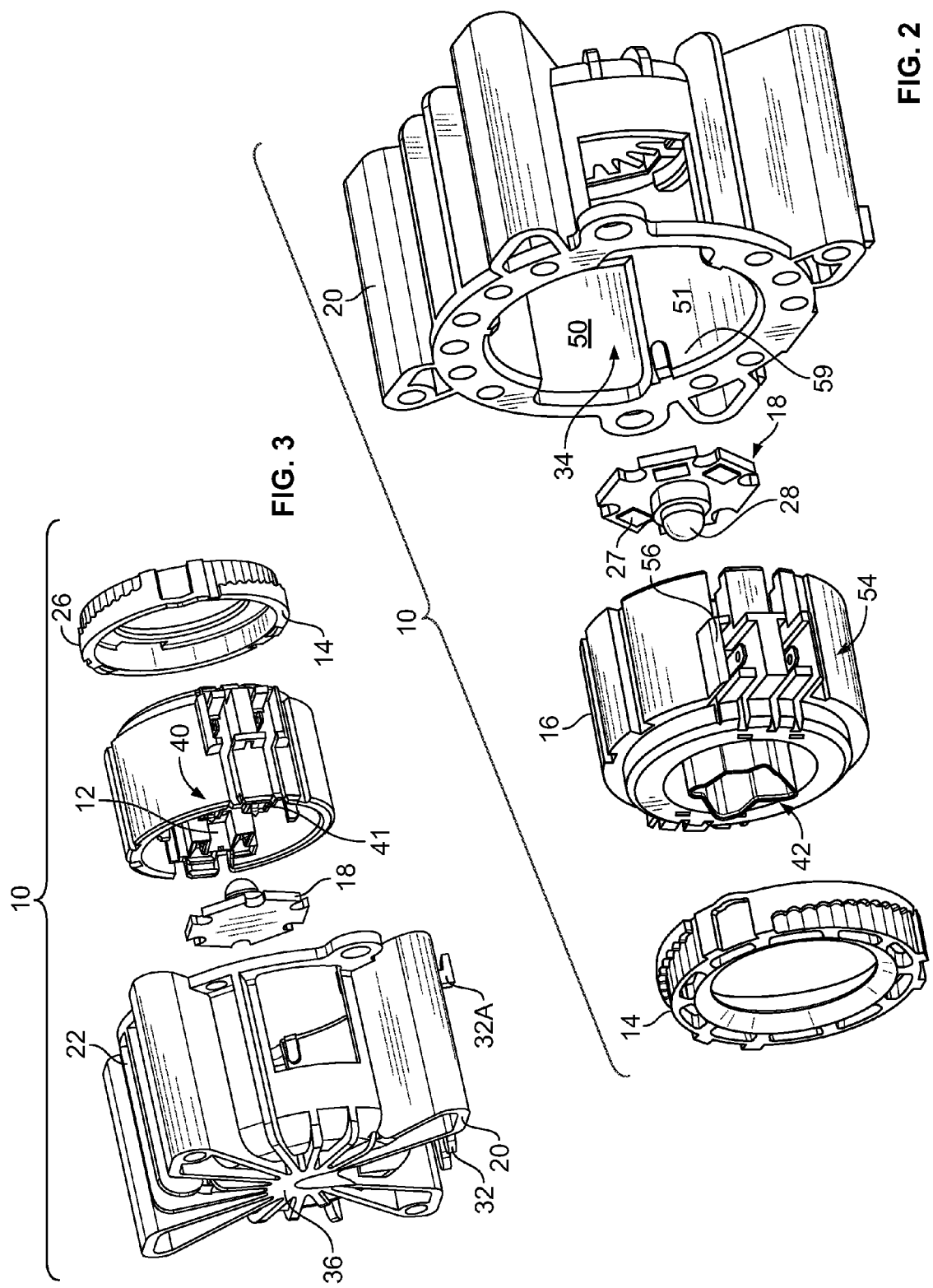

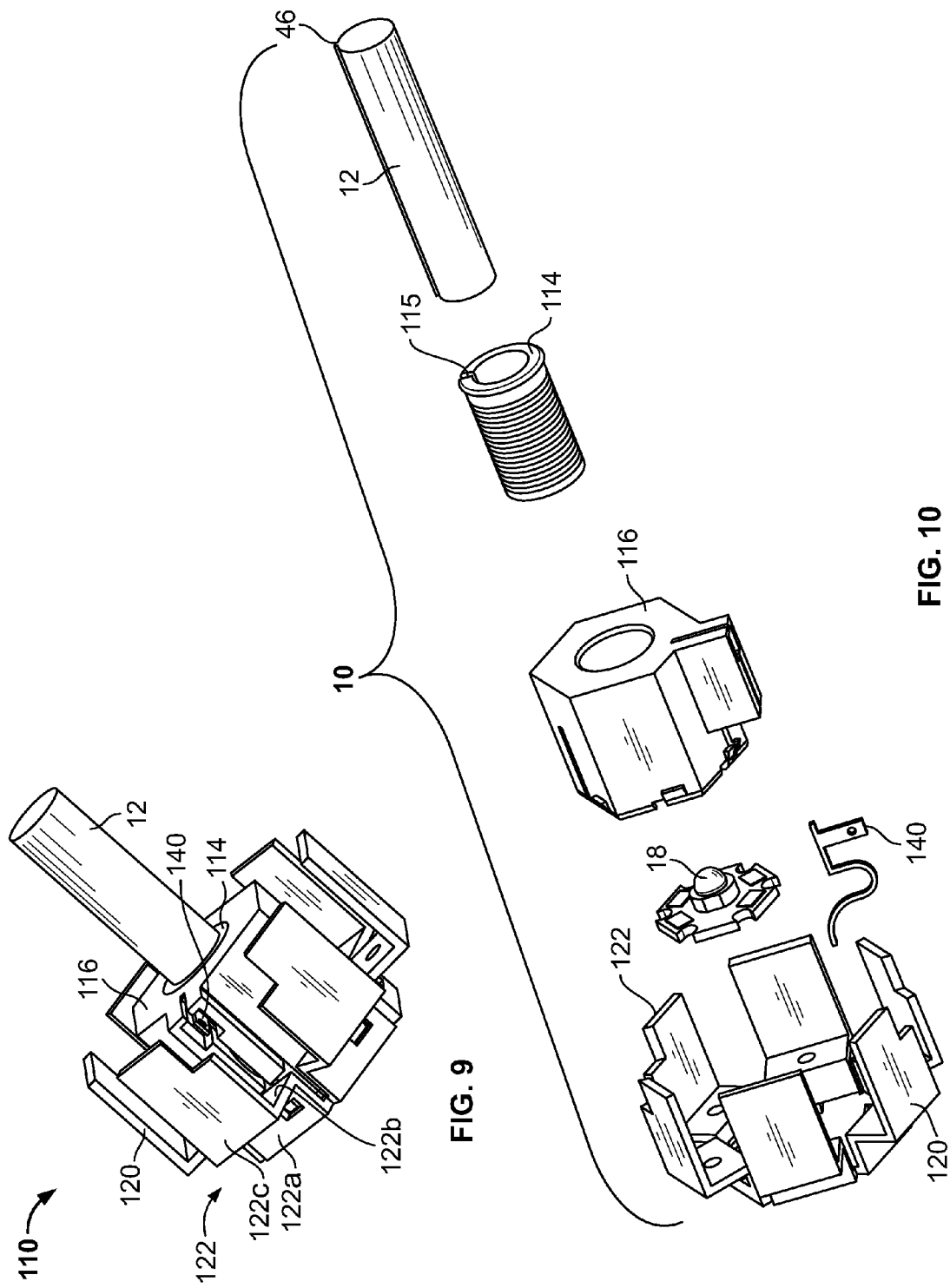

LED WITH LIGHT PIPE ASSEMBLY

CROSS REFERENCE TO RELATED APPLICATIONS

This application claims the benefit of U.S. Provisional Application No. 61/032,653 entitled LED WITH LIGHT PIPE ASSEMBLY filed Feb. 29, 2008.

BACKGROUND

The application generally relates to light emitting diode assemblies and systems, and more particularly, the disclosure relates to an assembly for a high-power LED with a light pipe.

Light pipes conduct the flow of light from a light source to a point of use. Light pipes may be used to illuminate areas that are small or hazardous and do not permit the installation of a standard incandescent or fluorescent light bulb. Light pipes may also be used in heat transfer and ultraviolet light (UV) curing applications. There are two basic types of light pipes: liquid and fiber optic. Liquid light pipes have a flexible outer sheath and a light-conducting liquid core. They are sealed with quartz windows that can be made transparent to a range of wavelengths. Fiber optic light pipes consist of a non-coherent bundle of optical fibers. The fibers at each end of the bundle are tightly compressed, cut perpendicular to the axis of the fibers, and polished to permit light to pass into and out of the bundle. Fiber optic light pipes are less flexible than liquid light pipes, but are well-suited for the transmission of light in the visible and near-infrared range. Liquid light pipes are better suited for the transmission of UV light. Light pipes may be rigid and straight, rigid and bent, or flexible.

An LED light pipe is a linear light source that uses a large core optical fiber rod that projects a band of LED driven light along the entire length of the rod. The LED meets recently established regulatory standards by the European Union (EU) market restricting the use of new electrical and electronic equipment containing more than agreed levels of toxic or hazardous substances, e.g., lead, cadmium, mercury, hexavalent chromium, polybrominated biphenyl (PBB) and polybrominated diphenyl ether (PBDE) flame retardants. The LED light pipe may be used for accent and trim lighting found in appliances, automobiles and displays, and may also be used as a direct lighting source for interior or exterior lighting in configurable shapes and sizes. An LED light pipe includes an LED, light pipe, driver circuit board, brackets and cables. An LED may also include various colors of high-power LEDs and dimming controls.

Most existing high power LEDs are customized for specific applications, and are assembled by soldering the various components together, or by adhesively attaching the components to a thermally conductive substrate using an epoxy that is thermally conductive. The electrical and thermal interconnections are separately configured, which is a labor intensive process.

What is needed is an LED light engine assembly for a light pipe having components that can be assembled without soldering or adhesives, and which integrates the electrical interconnect and interface into a single unit. Another need to be satisfied is to provide a simple optical interface into which a light pipe may be inserted.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to an LED light pipe assembly. The LED light pipe assembly includes a light pipe; a heat sink portion; an LED mounted on a substrate in optical communication with the light pipe; and a carrier portion for receiving the light pipe and providing electrical interconnections to the LED. The heat sink portion includes a plurality of fins and a plurality of hollow frame portions configured to dissipate heat generated by the light pipe assembly. Attachment features are provided on the heat sink for attaching the heat sink to the carrier portion. The heat sink portion also includes a hollow cavity for receiving the substrate. The carrier portion is insertable into the cavity in abutting relation with the substrate to secure the substrate in contact against the heat sink.

Another embodiment is directed to an LED light pipe assembly. The LED light pipe assembly includes a light pipe; a heat sink portion; an LED mounted on a substrate in optical communication with the light pipe; and a carrier portion for receiving the light pipe and providing electrical interconnections to the LED. The heat sink portion includes a plurality of fins configured to dissipate heat generated by the light pipe assembly. Attachment features are provided on the heat sink for attaching the heat sink to the carrier portion. The heat sink portion also includes a hollow cavity for receiving the substrate. The carrier portion is insertable into the cavity in abutting relation with the substrate to secure the substrate in contact against the heat sink.

Other embodiments are contemplated within the scope of the detailed description set forth below.

One advantage is a single holder design for standard high-power LEDs by different manufacturers using a standard hexagonal printed circuit board (PCB) format, commonly referred to as a "star" board because of multiple peripheral extensions surrounding an interior area. The light engine may include electrical contacts that accommodate singular or multiple arrangements of LEDs, e.g., for RGB full color control.

Alternative exemplary embodiments relate to other features and combinations of features as may be generally recited in the claims.

BRIEF DESCRIPTION OF THE FIGURES

FIG. 2 is an exploded perspective view of the LED light pipe engine assembly of FIG. 1 taken from a forward angle.

FIG. 3 is an exploded perspective view taken of the LED light pipe engine assembly of FIG. 1 taken from a rear angle.

FIG. 9 is a perspective view of an alternate embodiment of the LED light pipe assembly.

FIG. 10 is an exploded perspective view of the alternate embodiment of the LED light pipe assembly.

Wherever possible, the same reference numbers will be used throughout the drawings to refer to the same or like parts.

DETAILED DESCRIPTION OF THE EXEMPLARY EMBODIMENTS

Figure 1:
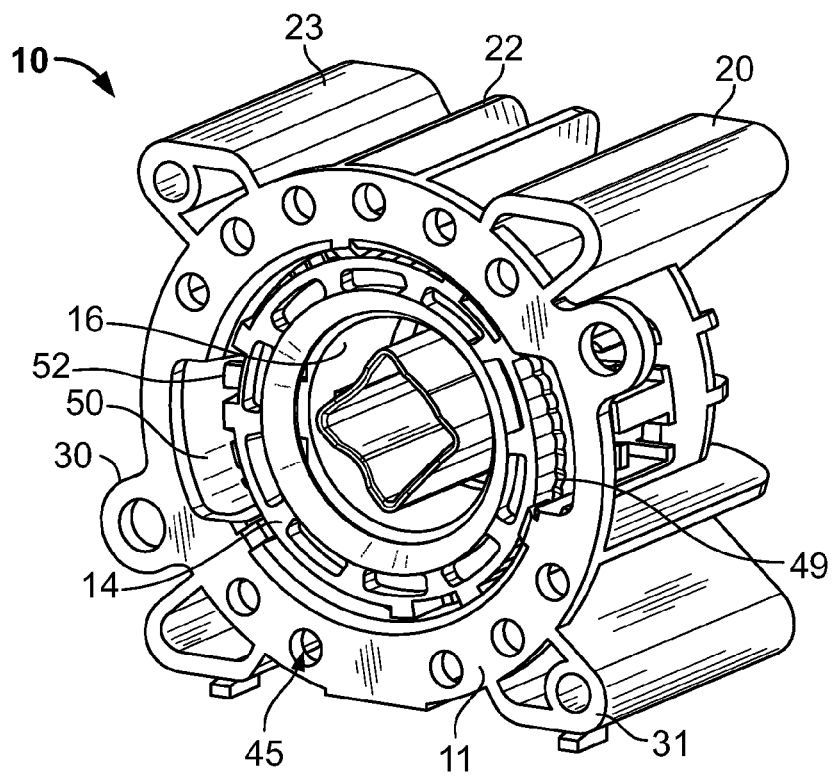
FIG. 1 is a front perspective view of an exemplary LED light pipe engine assembly according to the invention.

Referring to FIGS. 1-3, an LED light pipe assembly 10 includes a heat sink 20, an LED 28 mounted on a printed circuit board (PCB) or substrate 18, a contact carrier 16 and a locking ring 14. The heat sink 20 may be formed from a thermally conductive material, e.g., aluminum or aluminum alloys, or thermally conductive polymeric material. The heat sink 20 dissipates heat generated by the LED PCB 18 and LED 28. The heat sink 20 includes fins 22 and hollow frame portions 23 that provide surface areas exposed to the ambient air, to increase the rate at which heat dissipates from the light pipe assembly 10. Mounting lugs 30, 31, 32 and 32a may be included in the heat sink 20 to provide face mounting, rear mounting and base mounting options, to accommodate various installation arrangements. E.g., lugs 30 are attached to a flange portion 11 and provide face mounting options where the light pipe attaches to a rear surface of a panel (not shown). Alternately, lug 31 provides a rear mounting arrangement to a surface on the opposite side of the heat sink 20 from the light opening. The flange portion 11 of the heat sink 20 provides attachment features for the contact carrier 16. The flange portion 11 may include apertures 41 that provide airflow passages to dissipate additional heat from the heat sink 20. The locking ring 14 secures the internal components—i.e., the contact carrier 16 and LED PCB 18—inside the heat sink 20.

The heat sink 20 has a hollow cavity 34 for receiving the LED PCB 18 adjacent to the base portion 36, which is retained in thermal contact with the heat sink 20. The contact carrier 16 is inserted into the cavity 34 and abuts against the LED PCB 18 to secure the LED PCB 18 in contact against the heat sink 20. The contact carrier 16 provides electrical communication between the LED PCB 18 and external terminals 38 (see, e.g., FIG. 5). A PCB contact interface 40 engages with contact pads 27 at terminals 41.

Figure 5:
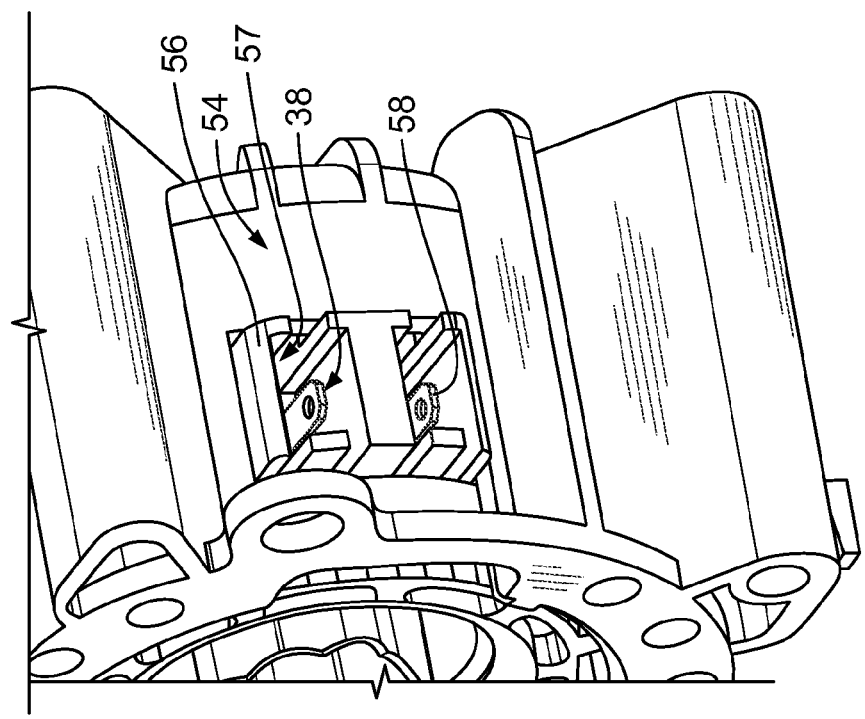
FIG. 5 is an enlarged view of the external power connector tabs of the contact carrier.

Referring to FIG. 5, a partial view of light pipe engine assembly 10 shows an enlarged view of external connectors 54. Shroud portions 56 surround a pair of recesses 57 having connector tabs 58 and 38 disposed within recesses 57. Tabs 58 and 38, e.g., may be Ultra Faston® tabs, manufactured by Tyco Electronics Company of Middletown, Pa. Tabs 58 and 38 are arranged for connection of LED PCB 18 to an external power source (not shown).

Figure 4:
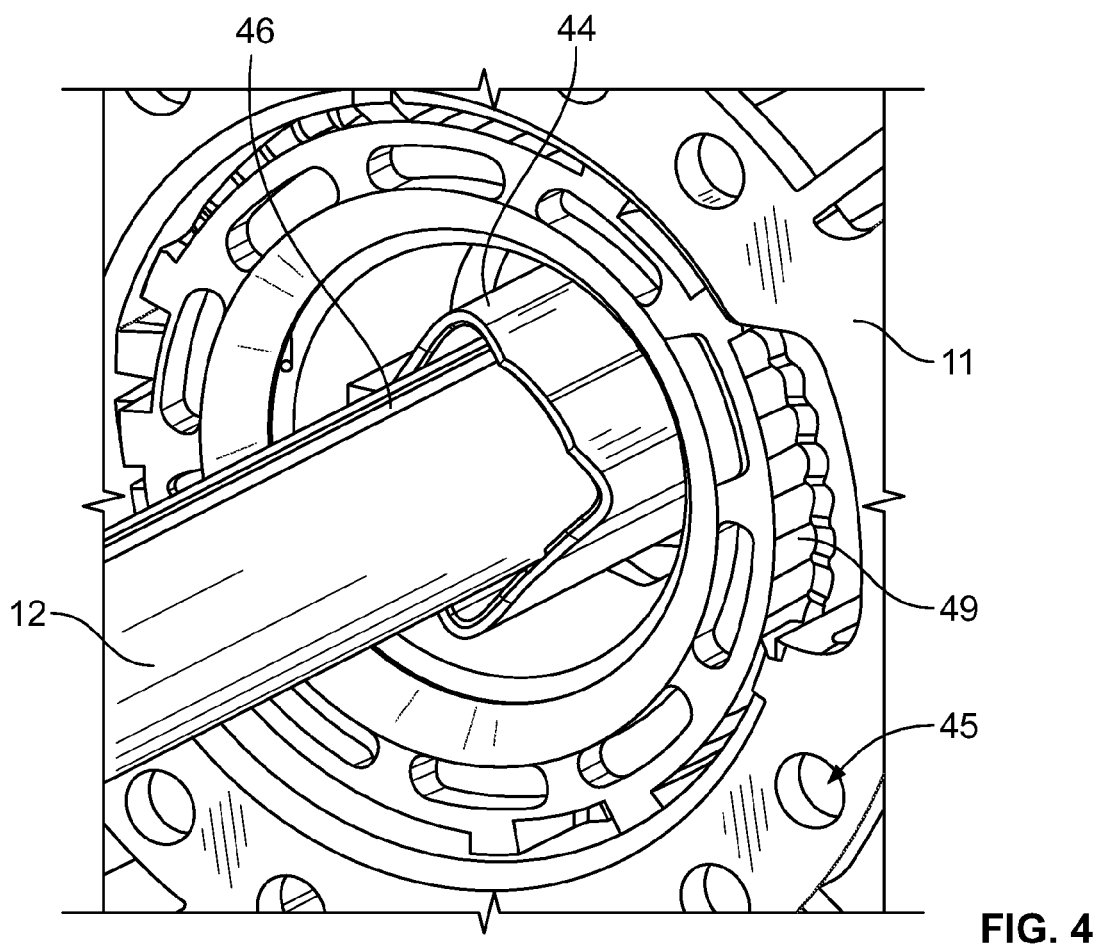
FIG. 4 is an enlarged view of a portion of the light pipe partially inserted into the contact carrier assembly.
Figure 6:
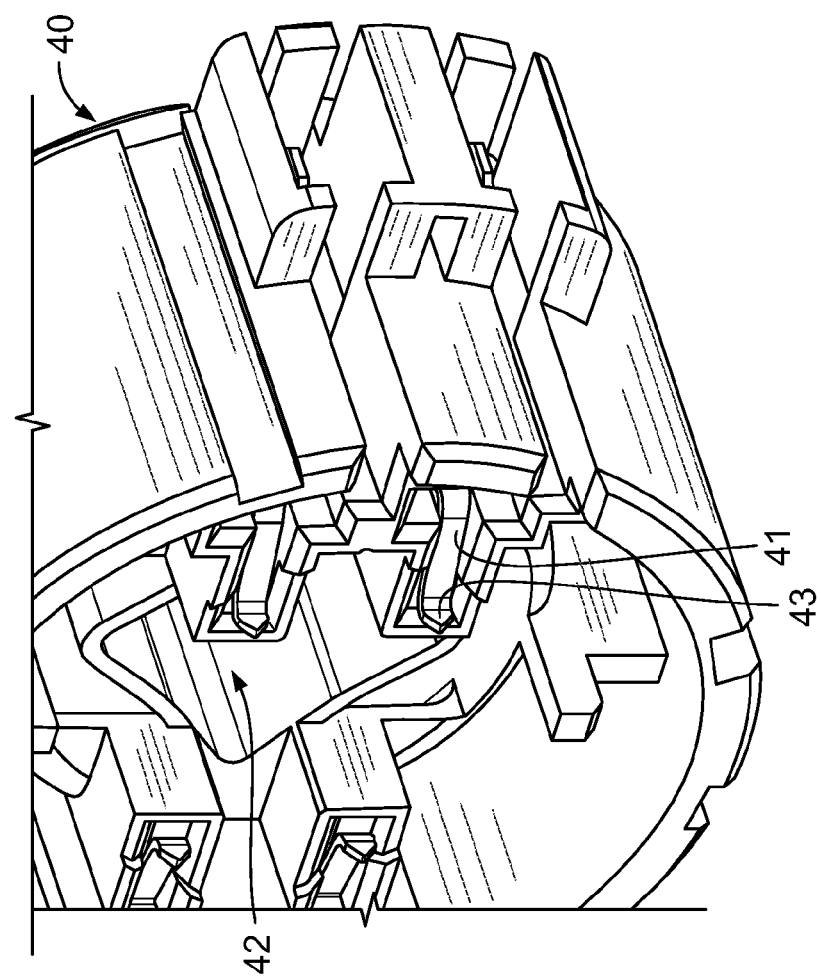
FIG. 6 is an enlarged view of the contact interface of the contact carrier.

FIGS. 4 & 6 show an enlarged sectional view of the contact interface 40 and associated terminals 41. Terminals 41 are typically made of a conductive metal such as copper or copper alloy, and have perpendicular end points 43 that provide positive normal force with the contact pads 27 and spring tension therebetween. The contact carrier 16 also includes a tube 44 which has an opening 42 for receiving light pipe 12. The light pipe 12 and the annular opening 42 are substantially axially aligned with the LED 28. Reflector beams 46 (FIG. 4) may be positioned around the periphery of light pipe 12 at approximately 90° spacing. The reflector beams 46 extend longitudinally along the periphery of the light pipe, and parallel with the center axis of the cylindrical light pipe 12. Reflector beams 46 reflect light emanating from the LED source 28 back towards the center of light pipe 12 to generate a linear light beam. In an alternate embodiment, an annular opening 42 may be used to receive light pipe 12, and include slots (not shown) for receiving one or more reflector beams 46.

Figure 7:
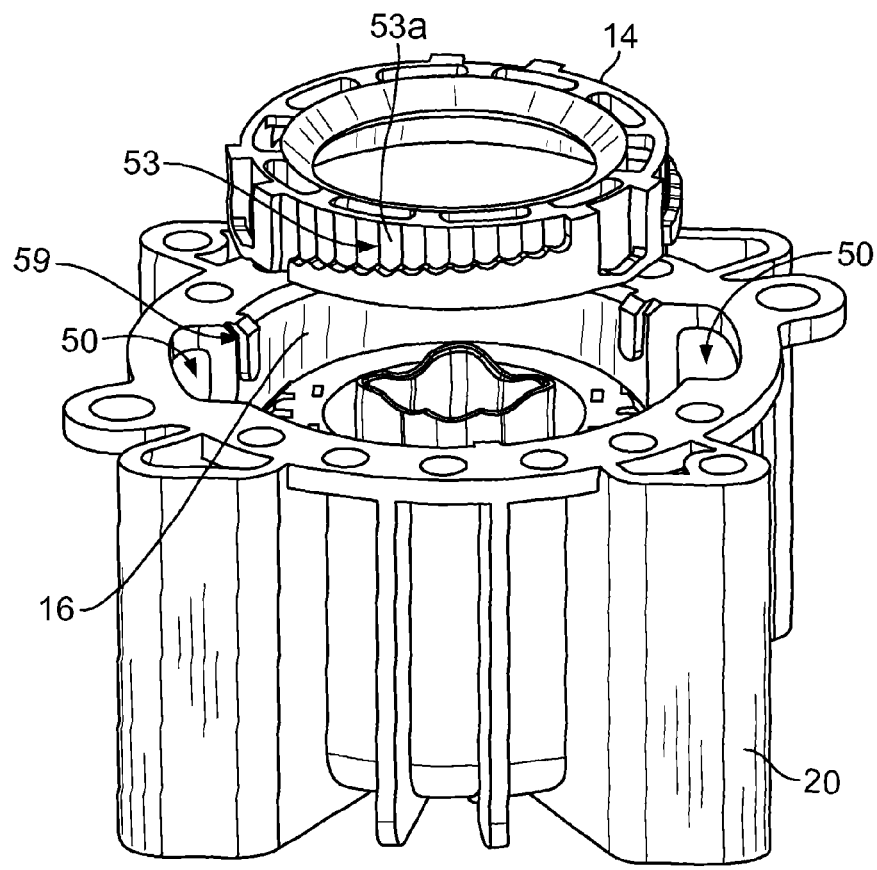
FIG. 7 is a disassembled perspective view of the locking ring in relation to the heat sink, illustrating the rotating ratchet features for interlocking the locking ring in the heat sink.
Figure 8:
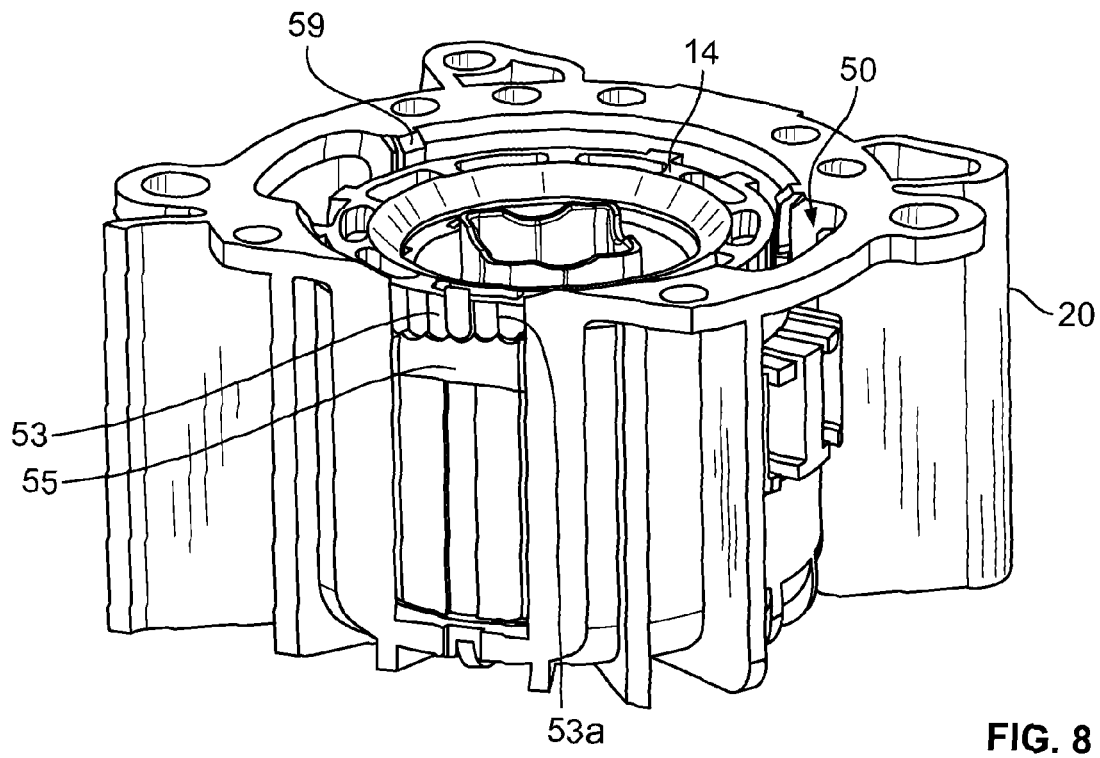
FIG. 8 is an assembled view of the locking ring inserted in the heat sink.
Figure 11:
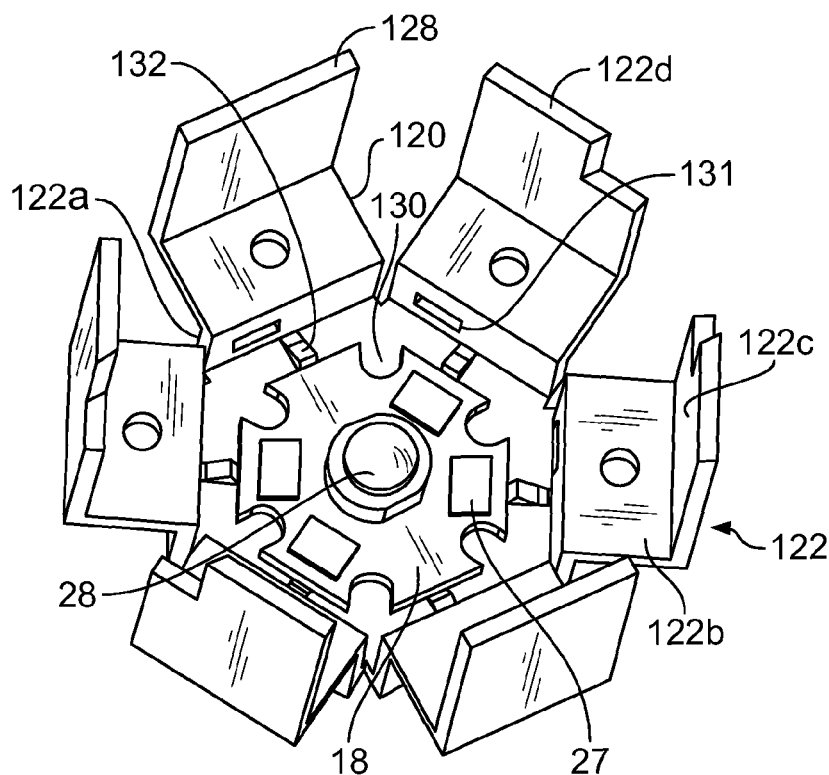
FIG. 11 is a perspective view of the heat sink and LED PCB.
Figure 12:
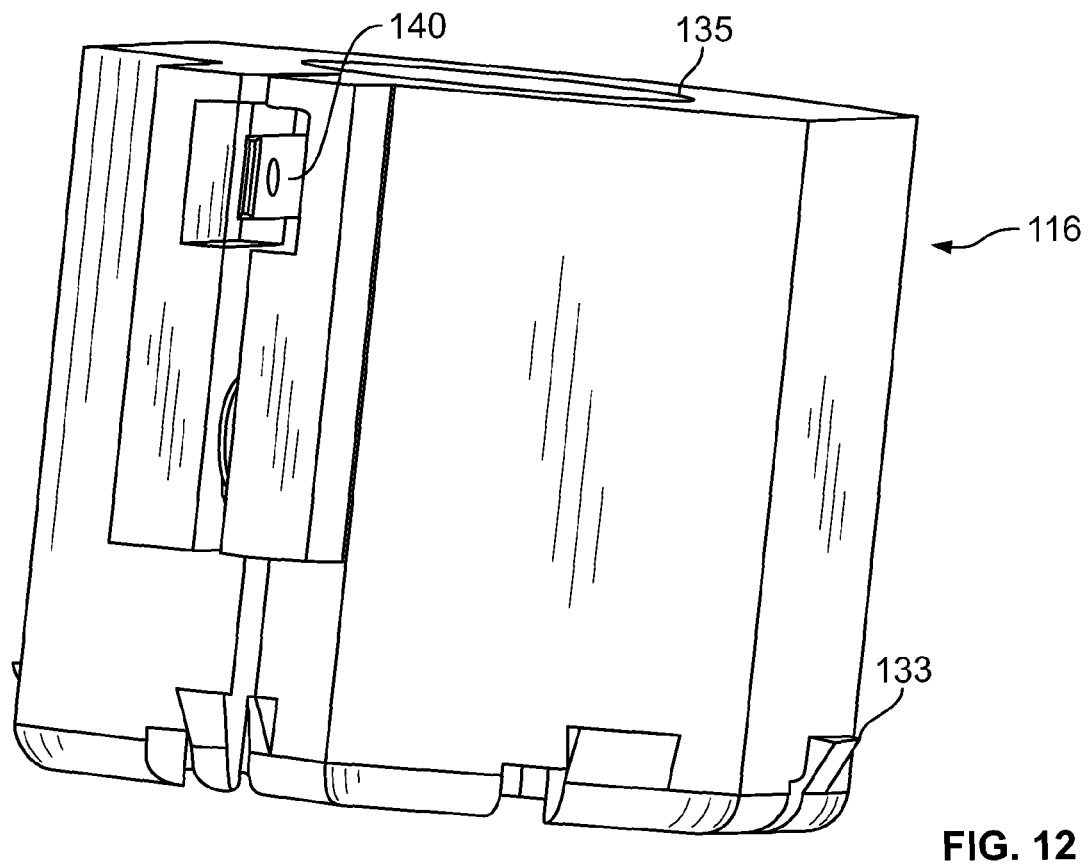
FIG. 12 is a perspective view of the contact carrier.

Referring next to FIGS. 7 & 8, locking ring 14 includes a series of adjacent cavities 53 of decreasing depth along a sidewall 55 of locking ring 14. Cavities 53 are defined by ridges 53a which engage a ratchet tooth, or ratchet teeth 59. In the exemplary embodiment shown in FIGS. 7 & 8, three ratchet teeth 59 are shown. Ratchet teeth 59 are disposed on an inner wall 51 of the heat sink 20 (See, e.g., FIG. 2). Locking ring 14, when inserted into recess 50 in heat sink inner wall 51, can be inserted to a variable depth until it contacts the surface of contact portion 16. Locking ring 14 is then rotated, with ridges 53a then engaging ratchet teeth 59. As locking ring is rotated, the stepped cavities 53 advance locking ring 14 deeper into the hollow cavity 34 of the heat sink 20, and positively engage locking ring 14 against contact carrier 16. Contact carrier 16 is retained inside the heat sink 20 in this manner by the locking ring 14. Locking ring 14 may be rotated in the reverse direction to release contact carrier 16, e.g., for removal and replacement of LED PCB 18.

Referring next to FIGS. 9-12, another exemplary embodiment of a light pipe assembly 110 is shown. A heat sink 120 includes a hexagonal or six-sided configuration of right-angle fins 122, although other geometric configurations having greater or fewer sides are also within the scope of this disclosure. Right angle fins 122 extend circumferentially outward from a base plate 130 in a step-like configuration. Each of fins 122 is attached to base plate 130 at one end of a first plate 122a that extends substantially perpendicular from base plate 130. First plate 122a turns outward at approximately a 90° angle away from base plate 130, at the junction where first plate 122a connects with a lateral or horizontal plate 122b. Lateral plate 122b is connected to a second plate 122c at the end opposite from first plate 122a. Second plate 122c extends substantially perpendicular from the junction with lateral plate 122b, and terminates at a distal end 122d. Fins 122 provide expanded surface area for conducting heat from LED PCB 18. First plate 122a may include slots 131 for receiving corresponding protrusions 133 (FIG. 12) disposed on the contact carrier 116. Protrusions 133 are configured to snap into slots 131 to retain the contact carrier 116. Protrusions 133 may be flexible to release the contact carrier 116 when force is applied, to permit replacement of LED PCB 18 or light pipe 12. Lateral plate 122b may include apertures 128 for mounting hardware, e.g., screws or studs. In the embodiment shown in FIG. 12, a single contact 140 is shown for simplicity, but it will be understood that four contacts 140 may be more commonly employed, and more or less contacts may be employed to suit alternative LED PCB 18 configurations, for example, where multiple LEDs are mounted on LED PCB 18. Contact carrier 116 may include a ridge 135 to retain an elastomer light pipe holder 114 (FIG. 10).

Elastomer light pipe holder 114 includes a tubular ribbed cylinder for holding light pipe 12. Holder 114 includes a slot 115 for receiving reflector beams 46. In an exemplary embodiment, reflector beams 46 may be spaced about the periphery of the light pipe at approximately 90° intervals. Holder 114 in an alternate embodiment may be friction fit into the contact carrier 116 to secure light pipe 12 to the contact carrier 116. Holder 114 may be flexible to compensate for manufacturing tolerances in the outside diameter of light pipe 12. The LED PCB 18 rests on base plate 130. Protrusions 132 hold LED PCB 18 in alignment on base plate 130.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the light pipe assembly as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

What is claimed is:

1. An LED light pipe assembly comprising:
   a light pipe;
   a heat sink portion,
   an LED mounted on a substrate in optical communication with the light pipe; and
   a carrier portion for receiving the light pipe and providing electrical interconnections to the LED;
   the heat sink portion comprising:
      a plurality of fins and a plurality of hollow frame portions configured to dissipate heat generated by the light pipe assembly;
      at least one attachment feature for attaching the heat sink to the carrier portion;
      a hollow cavity for receiving the substrate; and
   the carrier portion configured to be inserted into the cavity in abutting relation with the substrate to secure the substrate in contact against the heat sink.

2. The LED light pipe assembly of claim 1, the hollow frame portion having surface areas in thermal communication with an ambient air environment.

3. The LED light pipe assembly of claim 1, wherein substrate is adjacent to a base portion of the heat sink, the base portion arranged in thermal contact with the heat sink.

4. The LED light pipe assembly of claim 1, wherein the carrier portion is further configured in electrical communication with at least one external terminal for powering the LED.

5. The LED light pipe assembly of claim 1, wherein the carrier portion is insertable into the hollow cavity adjacent the substrate to secure the substrate in thermal contact with the heat sink, the carrier portion further configured to provide electrical communication between the LED and at least one external terminal.

6. The LED light pipe assembly of claim 1, wherein the heat sink further comprises a flange portion adjacent an end of the heat sink, the flange portion configured to attach the heat sink to the carrier portion.

7. The LED light pipe assembly of claim 6, wherein the flange portion further comprises a plurality of airflow passages.

8. The LED light pipe assembly of claim 1, wherein the heat sink further comprises at least one mounting lug, the at least one mounting lug configured for attaching the heat sink by at least one of a face mounting arrangement, a rear mounting arrangement, and base mounting arrangement.

9. The LED light pipe assembly of claim 1, wherein the assembly further comprises a locking ring portion comprising a plurality of adjacent cavities disposed in a sidewall, the cavities progressively decreasing in depth along the sidewall; and a plurality of ridges defining each of the adjacent cavities; the cavities configured to engage at least one ratchet tooth disposed on an inner wall of the heat sink.

10. The LED light pipe assembly of claim 9, wherein the locking ring is insertable to a variable depth and rotatable such that the ridges engage the at least one ratchet tooth; and the cavities force the locking ring deeper into the heat sink when the locking ring is rotated, to positively engage the locking ring against the carrier portion.

11. The LED light pipe assembly of claim 10, wherein the locking ring is reversely rotatable to release the contact carrier.

12. An LED light pipe assembly comprising:
   a light pipe;
   a heat sink portion,
   an LED mounted on a substrate in optical communication with the light pipe; and
   a carrier portion for receiving the light pipe and providing electrical interconnections to the LED;
   the heat sink portion comprising:
      a plurality of fins configured to dissipate heat generated by the light pipe assembly;
      at least one attachment feature for attaching the heat sink to the carrier portion;
      a hollow cavity for receiving the substrate; and
   the carrier portion configured to be inserted into the cavity in abutting relation with the substrate to secure the substrate in contact against the heat sink.

13. The assembly of claim 12, wherein the heat sink further comprises:
   a base plate having a plurality of peripheral surfaces, each surface having a fin portion extending therefrom.

14. The assembly of claim 13, wherein at least one fin extends circumferentially outward from the base plate in a step-like configuration.

15. The assembly of claim 13, wherein each fin comprises a first plate and a second plate joined together by a lateral plate, wherein the first plate attaches to the base plate at a first end of the first plate, and the first plate turns outward at approximately a 90° angle away from the base plate, at a junction the lateral plate; the lateral plate connected to the second plate at an end opposite the first plate; the second plate extending substantially perpendicular from the junction with the lateral plate.

16. The assembly of claim 13, wherein the fins are configured to provide expanded surface area for conducting heat away from the LED.

17. The assembly of claim 15, wherein the first plate further comprises a slot, and the carrier portion comprises a protrusion corresponding with the slot, the slot configured for receiving the corresponding protrusion disposed on the contact carrier portion on the heat sink.

18. The assembly of claim 17, wherein the protrusion is flexible when force is applied to release the contact carrier.

19. The assembly of claim 15, wherein the lateral plate comprises at least one aperture for receiving mounting hardware.

20. The assembly of claim 12, wherein the carrier portion further comprises a ridge portion configured to retain an elastomer light pipe holder.

* * * * *